(12) United States Patent
Jang et al.

(10) Patent No.: US 7,643,790 B2
(45) Date of Patent: Jan. 5, 2010

(54) LOCAL COMMUNICATION SYSTEM AND METHOD IN WIRELESS COMMUNICATION SYSTEM

(75) Inventors: Kyung-Hun Jang, Suwon-si (KR); Chang-Woo Seo, Suwon-si (KR); Jin-Bong Cahng, Daejeon (KR); Jin-Youn Cho, Seoul (KR); Hyo-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 919 days.

(21) Appl. No.: 10/858,986

(22) Filed: Jun. 2, 2004

(65) Prior Publication Data

US 2005/0003856 A1 Jan. 6, 2005

(30) Foreign Application Priority Data

Jun. 3, 2003 (KR) .................. 10-2003-0035753

(51) Int. Cl.
*H04B 7/15* (2006.01)
(52) U.S. Cl. ...................... 455/11.1; 455/231
(58) Field of Classification Search ........... 455/41.2, 455/464, 450, 453, 13.1, 451, 452.1, 7, 11.1; 370/230, 231, 229
See application file for complete search history.

(56) References Cited

U.S. PATENT DOCUMENTS 5,983,073 A * 11/1999 Ditzik ................. 455/11.1

| 6,198,728 B1 | 3/2001 | Hulyalkar et al. |
| 2002/0105970 A1 | 8/2002 | Shvodian |
| 2004/0013135 A1* | 1/2004 | Haddad ............... 370/493 |

FOREIGN PATENT DOCUMENTS

| JP | 2001-333067 | 11/2001 |
| WO | WO 03/063434 | 7/2003 |

OTHER PUBLICATIONS

Draft Standard for Telecomunications and Information Exchange Between Systems—LAN/MAN Specific Requirements—Part 15.3: Wireless Medium Access Control (MAC) and Physical Layer (PHY) Specifications for High Rate Wireless Personal Area Networks (WPAN), Feb. 2003.

* cited by examiner

*Primary Examiner*—Tu X Nguyen
(74) *Attorney, Agent, or Firm*—NSIP Law

(57) ABSTRACT

Local communication system in wireless communication system includes a main wireless terminal negotiating with each of the peripheral wireless terminals during a time period for which a frame will be transmitted, generating a schedule map including negotiated time information and a transmission sequence of each of the peripheral wireless terminals, and transmitting the generated schedule map to all peripheral wireless terminals; and the peripheral wireless terminals storing the schedule map received from the main wireless terminal, and performing communication with the main wireless terminal according to the sequence determined in the schedule map for the negotiated time period.

23 Claims, 11 Drawing Sheets

LOCAL COMMUNICATION SYSTEM AND METHOD IN WIRELESS COMMUNICATION SYSTEM

PRIORITY

This application claims priority to an application entitled "Local communication system and method in wireless communication system" filed in the Korean Intellectual Property Office on Jun. 3, 2003 and assigned Serial No. 2003-35753, the contents of which are incorporated herein by reference.

BACKGROUND OF THE INVENTION

1. Field of the Invention

The present invention relates to a local communication system and a method in a wireless communication system, and more particularly to a local communication system and a method for allowing a plurality of terminals to perform wireless communication.

2. Description of the Related Art

Typically, a local area network (LAN) is a network developed from a wire-based communication network. The local area network is a small or medium scale of a wire network constructed by means of a coaxial cable, so that terminals in the local area network can share or exchange data with each other. Since the local area network as described above is a wire-based network, it is by its nature limited in mobility.

Wireless communication technology may be classified into various methods according to a classification standard into a frequency division multiplexing (FDM) method using a frequency division, and a code division multiplexing (CDM) method using a code division. From among the methods described above, a CDMA mobile communication system using the CDM method is currently in use and classified into a synchronous CDMA and an asynchronous CDMA. In the synchronous code division multiple access (CDMA) mobile communication system technology, a 1x EV-DO system capable of transmitting high speed data has currently reached its commercialization stage as Additionally, a 1x EV-DO system capable of providing both a voice and high-rate data has been developed.

With the convenience of the wireless communication system and development of technologies as described above, there is an increased in the demand for various networks for performing communication in wireless manner, including systems to be constructed in a home. The services currently being provided provide a method of connecting one wireless terminal to a wire-based network through one wireless connection node. However, since there is an increase in demand for systems where two or more wireless terminals are provided even in a home, a method is required that allows more than one terminal to be connected to one wireless connection node.

Data provided in various fields is gradually being transmitted in large quantities. For instance, in a public wireless broadcasting system provided in a broadcasting station, high definition (HD) televisions are now available and require high definition services to be provided. In addition to the various quality being required in an audio service, high quality of image data transmission is also being required together with the appearance of digital radio data (DVD). When integrally considering these requirements, data transmission at more than 100 Mbps must be performed even in a home.

In order to meet the aforementioned requirements, research has been pursued to apply high speed data wireless network technology in a network such as a local area network.

A method having been proposed for a local wireless communication system, which has being researched and developed, may include a wireless local area network (WLAN) and an ad-hoc network. Hereinafter, the wireless local area network and the ad-hoc network will be described.

First, in the wireless local area network, wire-based connections such as a coaxial cable are no longer required, and communication is performed by means of a radio frequency (RF) transmission. In such a wireless local area network, a specific node accesses another node on a competition basis. However, the mechanism for the connection is very complicated. Accordingly, when a specific terminal requires a high quality data transmission as described above, there exist many limitations in the wireless local area network. This is because the processing time required for the data transmission increases as the control mechanism increases in complication, or an expensive apparatus capable of quickly performing a complicated process is required.

In the ad-hoc network, a specific terminal transmits information to adjacent terminals, and the adjacent terminals retransmit the information to a further destination. In such a network, position change and path change of the adjacent terminals may frequently occur. Accordingly, a time delay or a transmission failure for a transmitted service may occur. That is, when a large quantity of data must be transmitted at a high speed as described above, a desired quality of service (QoS) cannot be satisfied.

SUMMARY OF THE INVENTION

Accordingly, the present invention solves at least the above-mentioned problems occurring in the prior art, and a first object of the present invention is to provide a local wireless communication system and method which can transmit data at a high speed through a simple control mechanism in a wireless communication network.

A second object of the present invention is to provide a local wireless communication system and method which can transmit data at a high speed while satisfying the desired service quality.

A third object of the present invention is to provide a local wireless communication system and method which can transmit data at a high speed without a separate repeater.

A fourth object of the present invention is to provide a local wireless communication system and method which can increase a wireless bandwidth by minimizing an overhead while providing a high speed data communication service.

In order to accomplish the aforementioned objects, there is provided a local wireless communication method in a wireless communication system including a main wireless terminal and at least two peripheral wireless terminals, the method comprising the steps of negotiating by the main wireless terminal with each of the at least two peripheral wireless terminals that requests data communication, generating a schedule map including negotiated time information and a transmission sequence for the requesting peripheral wireless terminals, and transmitting the generated schedule map to the requesting peripheral wireless terminals; and said performing by each requesting peripheral wireless terminal communication circularly and directly with the main wireless terminal according to the transmission sequence determined in the schedule map for the time period determined in the received schedule map.

In order to accomplish the aforementioned objects, there is provided a system for performing a local wireless communication in a wireless communication system including a main wireless terminal and at least two peripheral wireless terminals, the system comprising: a main wireless terminal for negotiating with each of the peripheral wireless terminals requesting transmission during a time period for which a frame will be transmitted, generating a schedule map including negotiated time information and a transmission sequence of each of the requesting peripheral wireless terminals, and transmitting the generated schedule map to all peripheral wireless terminals; and the peripheral wireless terminals storing the schedule map received from the main wireless terminal, and directly performing communication with the main wireless terminal according to the sequence determined in the schedule map for the negotiated time period.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
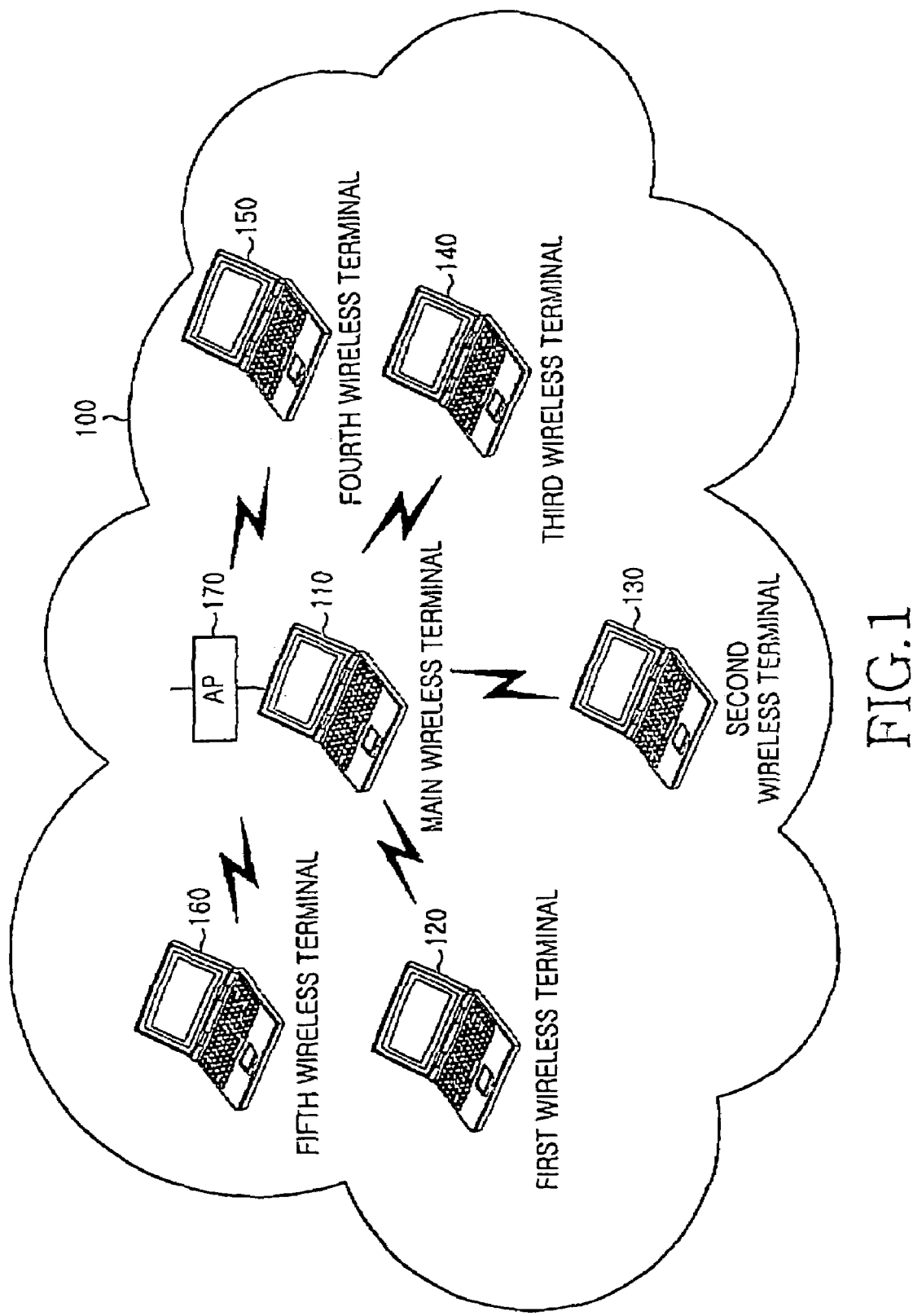
FIG. 1 is a diagram illustrating connections between terminals in a wireless network according to an embodiment of the present invention.

Hereinafter, a preferred embodiment according to the present invention will be described with reference to the accompanying drawings. The same reference numerals are used to designate the same elements as those shown in other drawings. In the following description of the present invention, a detailed description of known functions and configuration incorporated herein will be omitted when it may obscure the subject matter of the present invention.

FIG. 1 is a diagram illustrating connections between terminals in a wireless network to which the present invention is applied. Hereinafter, a construction of the wireless network will be described with reference to FIG. 1.

FIG. 1 shows a network 100 including six wireless terminals and an access point 170 (AP) connected to a wire-based network. Hereinafter, a description will be provided on the assumption that a main wireless terminal 110 is connected to the access point 170 as shown in FIG. 1. Further, each of the wireless terminals 110, 120, 130, 140, 150 and 160 may be a terminal including a wireless apparatus. That is, all apparatuses including wireless communication apparatuses, such as PDAs, mobile communication terminals, or notebook computers, may be the wireless terminals. As shown in FIG. 1, the main wireless terminal 110 performs special operations for providing local communications according to the present invention.

Figure 2:
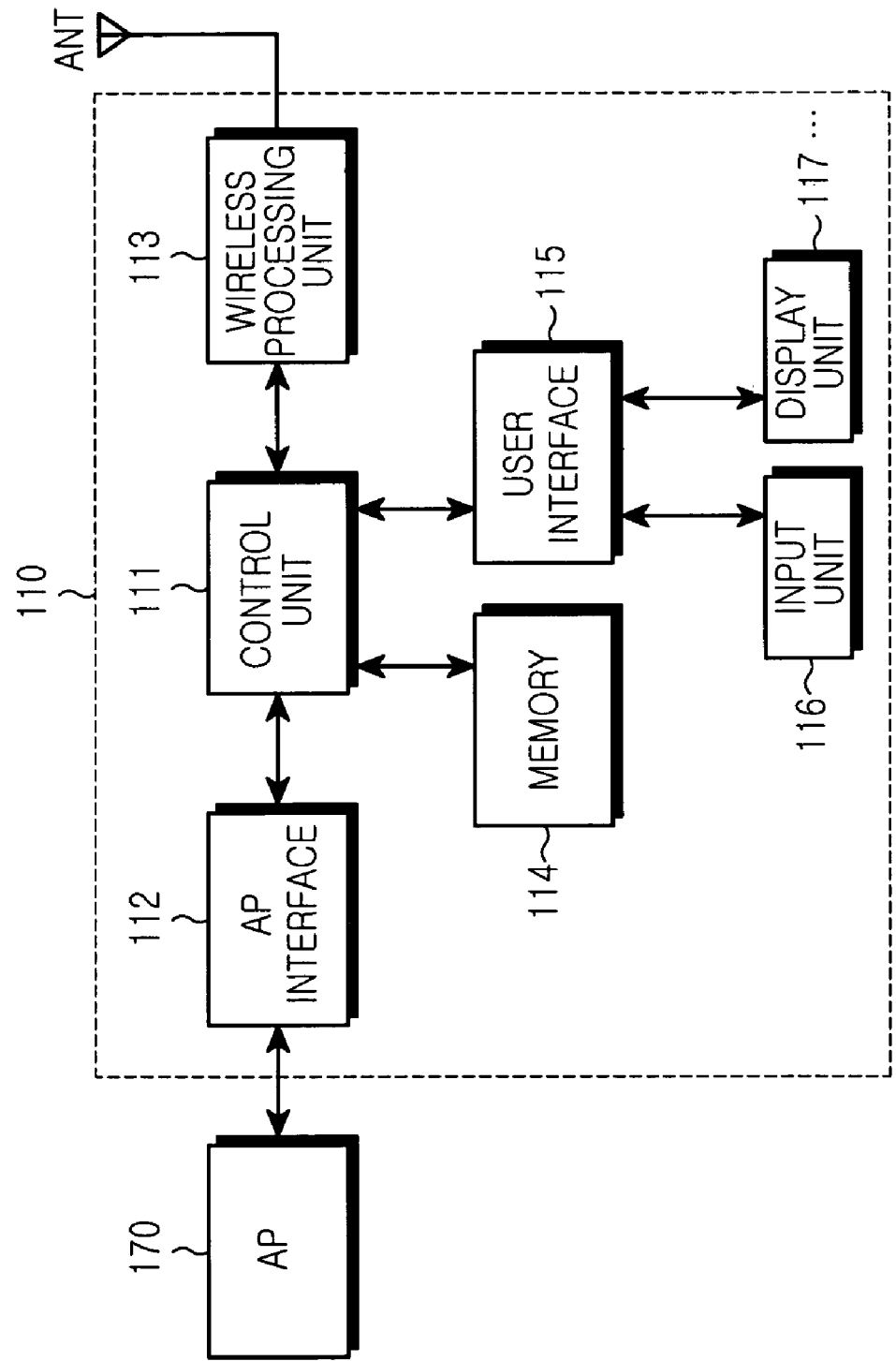
FIG. 2 is a block diagram of a main wireless terminal according to an embodiment of the present invention.

FIG. 2 is a block diagram of the main wireless terminal to which the present invention is applied. Hereinafter, an internal construction and operation of the main wireless terminal 110 according to the present invention will be described in detail with reference to FIG. 2.

A control unit 111 controls the main wireless terminal 110, and controls the local wireless communication when the local wireless communication is required according to the present invention. The control is classified into a control for a main wireless terminal and a control for a peripheral wireless terminal. When a network is constructed as shown in FIG. 1, a specific wireless terminal becomes the main wireless terminal 110 and other wireless terminals constituting the network become peripheral wireless terminals. Since the main wireless terminal 110 becomes the subject of a wireless communication with the other wireless terminals, the control unit 111 assigns a time required for communication to the other wireless terminals in a beacon period according to the present invention, and creates a schedule map according to the assigned time. An example of the schedule map is shown in Table 1.

TABLE 1

| Transmission sequence | Address of wireless terminal | Permitted transmission time (PTT) | Accumulated transmission time (ATT) |
|---|---|---|---|
| 1 | a first wireless terminal | 2 | 2 |
| 2 | a third wireless terminal | 3 | 5 |
| 3 | a fourth wireless terminal | 1 | 6 |
| 4 | a second wireless terminal | 2 | 8 |

As shown in table 1, each of the wireless terminals has a sequence for data transmission in the present invention. Only one wireless terminal can transmit a data frame at a specific point in time. As shown in Table 1, the sequence of each of the wireless terminals is matched with the address of each of the wireless terminals and the matched sequence and address are stored in the schedule map. Further, the schedule map stores a time (permitted transmission time, PTT) assigned to each of the wireless terminals for performing communications. The permitted transmission time may be calculated by seconds or by another unit of time. Since such a unit is an item which can be determined by contract in advance, the unit is not limited in the present invention. However, for helping the general understanding of the present invention, a description will be given on an assumption that the permitted transmission time may be calculated by seconds. The schedule map also stores accumulated transmission time (ATT) obtained by accumulating time periods of data transmission by a wireless terminal starting from an initial transmission. Since the schedule map is generated as described above, the beacon period is not determined to be a constant time. That is, one beacon period changes according to the total number of wireless terminals and a transmission time required for each wireless terminal.

As shown in Table 1, each wireless terminal does not always have the authority to generate a frame for the permitted transmission time and transmitting the generated frame. For example, in a case of the third wireless terminal 140, which transmits data in the second data transmission interval of the beacon period in Table 1, the third wireless terminal 140 is scheduled to generate and transmit two second of data. When the data is transmitted in this way, the accumulated transmission time becomes four seconds, which is the actual data transmission time, instead of five seconds. That is, every wireless terminal only generates frames that include only the data to be transmitted by itself and transmit the generated frames. Further, a wireless terminal, which will transmit data in the next data transmission interval, transmits the data after a period of an idle time when data transmission has not been detected for the idle time being set in advance.

The control unit 111 broadcasts information of the generated schedule map to all wireless terminals that are to perform communication, and allows the wireless terminals to receive the information. Further, the control unit 111 determines if a connection request of a specific wireless terminal exists. From the result of the determination, when the connection request of the specific wireless terminal exists during a predetermined time period in the beacon period, the control unit 111 detects the connection request, modifies the schedule map, and reports the modified schedule map. The control unit 111 performs communication through a wireless channel for the permitted transmission time for a connection with each wireless terminal during each beacon period.

In contrast, when the wireless terminal is a peripheral wireless terminal, the control unit 111 determines the beacon period, and performs a connection request at a predetermined time period during the beacon period when a wireless communication is required. When the connection has been completed, the control unit 111 receives and stores a broadcasted schedule map, and performs communication through a wireless channel according to the schedule map.

An access point interface 112 is connected to the access point 170 by a wire-based connection, and provides an interface for the data according to any number of methods known in the art. For example, in an X-Digital Subscriber Line (XDSL) method, the access point interface 112 processes data according to the XDSL method and performs an interface with the access point 170. In contrast, in an synchronous digital hierarchy (SDH) optical transmission methods, the access point interface 112 processes data according to the SDH method and performs an interface with the access point 170. Further, the access point interface 112 interfaces with elements that are outside the local network simultaneously performs an interface with the control unit 111, and processes data received from the elements outside of the local network to output the processed data to the control unit 111.

A wireless processing unit 113 up-converts data output from the control unit 111 to a predetermined RF band to broadcast the up-converted data through an antenna. The wireless processing unit 113 transmits data on an RF band in order to communicate with a specific wireless terminal according to the present invention, and sends the processed data into the air. The wireless processing unit 113 also receives data from the antenna, and provides the processed data to the control unit 111.

A memory 114 stores various programs for use in the main wireless terminal 110 and data generated when a program is performed. The memory 114 may include a read only memory (ROM) and random access memory (RAM), and further include a hard disk or an exterior subsidiary memory device. The memory 114 also includes an area for storing the schedule map according to the present invention. The memory 114 stores data of the schedule map as shown in Table 1. A user interface 115 converts graphic data, which is output from the control unit 111 to a user, to a display unit 117, or outputs data received from an input unit 116 to the control unit 111. The user interface 115 provides an interface between the user and the control unit 111.

The input unit 116 is a device through which a user inputs data to the wireless terminal, or the user inputs a signal requiring a predetermined operation. The input unit 116 may be a keyboard, a mouse, or a joystick, a keypad or a touch pad, or other input device. The input unit 116 may be also an infrared receiver. The display unit 117 displays an operation state of the device or a process step and service required by a user.

Figure 3:
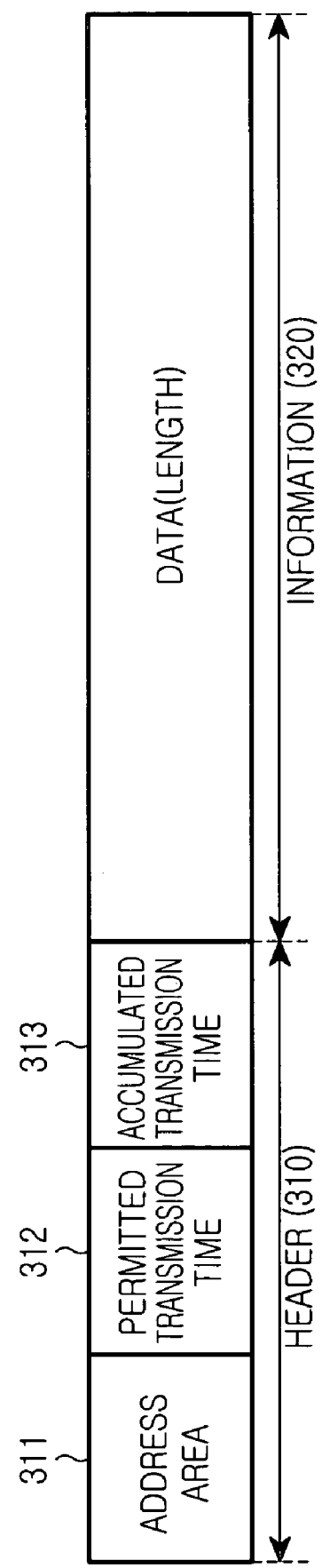
FIG. 3 is a diagram illustrating a structure of a data frame transmitted when a local wireless communication is performed according to a preferred embodiment of the present invention.

FIG. 3 is a diagram illustrating a structure of a data frame transmitted when a local wireless communication is performed according to a preferred embodiment of the present invention. The structure of a wireless frame according to the present invention will be described with reference to FIG. 3.

The frame includes a header part 310 and an information part 320. The header part 310 includes an address area 311, a permitted transmission time area 312, and an accumulated transmission time are 313. The address area 311 is an area contains an address of the next wireless terminal determined by the schedule map as shown in Table 1. A time period for which the frame is transmitted is contained in the permitted transmission time area 312, and the frame is transmitted for the time period given. Within the accumulated transmission time area 313, time periods, for which the frame including data to be transmitted has been transmitted in one beacon period, are accumulated and recorded. Herein, the accumulated transmission time may be calculated by accumulating the permitted transmission time of a corresponding terminal in advance and inserting the accumulated time into the header when data is to be transmitted by the corresponding terminal. The frame structure will be described with reference to Table 1.

When a wireless terminal, which will currently transmit data, is the first wireless terminal 120, the frame structure is as shown Table 2. Also, when a wireless terminal, which will currently transmit data, is the fourth wireless terminal 150, the frame structure is as shown Table 3.

TABLE 2

| The third wireless terminal | 2 | 2 | data |

TABLE 3

| The second wireless terminal | 1 | 6 | data |

As shown in Table 2 and Table 3, the wireless terminal that is scheduled to transmit data, designates an address of a wireless terminal in the next turn in the header in order to indicate the next wireless terminal. Further, time data to be transmitted by the wireless terminal transmitting the data is contained in the header, and accumulated time information is recorded in the last part of the header. The data stream is segmented into data corresponding to the permitted transmission time assigned to the wireless terminal, and the data is then transmitted. Herein, transmitting the accumulated time information as described above causes a circulation period of data transmission to be easily calculated through a modulo calculation. When a specific peripheral wireless terminal does not transmit data, the total accumulated transmission time may change. The next wireless terminal changes the accumulated transmission time to a value according to the schedule map to transmit the changed value. Data transmission is not actually performed, but the accumulated transmission time is determined by the schedule map.

In another method, all peripheral wireless terminals actually calculate the total accumulated transmission time when performing transmission and transmit the calculated time. Further, all wireless terminals can detect a wireless terminal which does not have data to transmit. Therefore, a transmission time value of a corresponding wireless terminal may be added to an accumulated value, and a modulo calculation is then performed at a point in time at which data transmission by the last wireless terminal in the schedule map has been completed.

Figure 4:
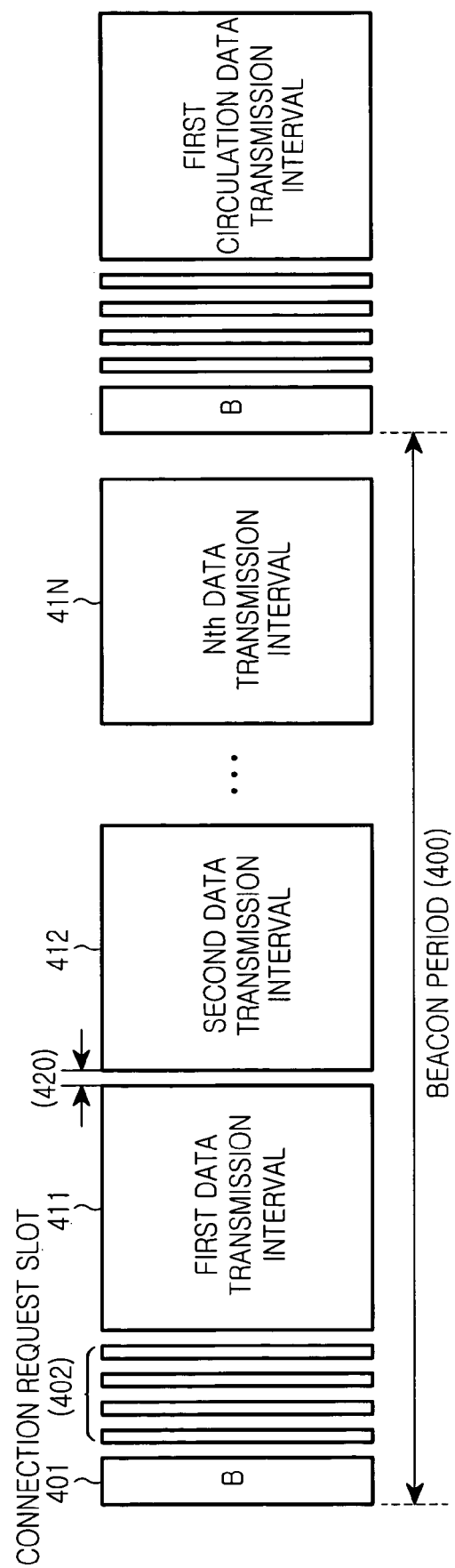
FIG. 4 is a timing chart of a beacon period according to a preferred embodiment of the present invention

FIG. 4 is a timing chart of a beacon period according to a preferred embodiment of the present invention. Each timing period of the beacon period according to the present invention will be described with reference to FIG. 4.

The start of the beacon period may be reported to other wireless terminals by transmitting a beacon header 401. The wireless terminals examines the beacon period more than once and determines a point in time at which the beacon header 401 is detected as a starting time point of one period. Connection request slots 402, which are used when other wireless terminals request a new connection, are provided after the beacon header 401. A wireless terminal, which does not perform a wireless communication, may perform a connection request during the connection request slots 402 after an ending time point of the beacon header 401. When the connection request exists as described above, the main wireless terminal generates a schedule map including a corresponding wireless terminal to transmit the generated schedule map to other wireless terminals.

When the time periods of the connection request slots 402 pass, each wireless terminal sequentially transmits data according to a sequence set in the schedule map. Reference numerals 411 to 41N correspond to intervals in which the data is sequentially transmitted. The intervals will be described with reference to Table 1. First, the first wireless terminal 120 transmits data in the first transmission interval 411, and the third wireless terminal 140 transmits data in the second transmission interval 412. Since each interval is a time period set according to the schedule map, each interval has a time interval different from each other. Further, since each wireless terminal is spaced a predetermined interval from other wireless terminals, including the main wireless terminal 110, and the data transmission is performed through a wireless channel, each wireless terminal has an idle time for detecting a transmission completion time point of each data. Reference numeral 420 in FIG. 2 represents such an idle time. The idle time may be set by negotiation between the main wireless terminal and other wireless terminals, or may be a predetermined time period. When the idle time is detected, each wireless terminal existing on the schedule map transmits the data according to the sequence of the schedule map. Further, as described in FIG. 3, the wireless terminal transmitting the data designates another wireless terminal in the address area 311 of the header 310, which will transmit data in the next data transmission interval. A wireless terminal awaiting data transmission examines the address area in which a wireless terminal for transmitting the next data is designated. As a result of the examination, when the wireless terminal is selected as a wireless terminal which will transmit the data, the wireless terminal transmits the data in the next data transmission interval.

Figure 5:
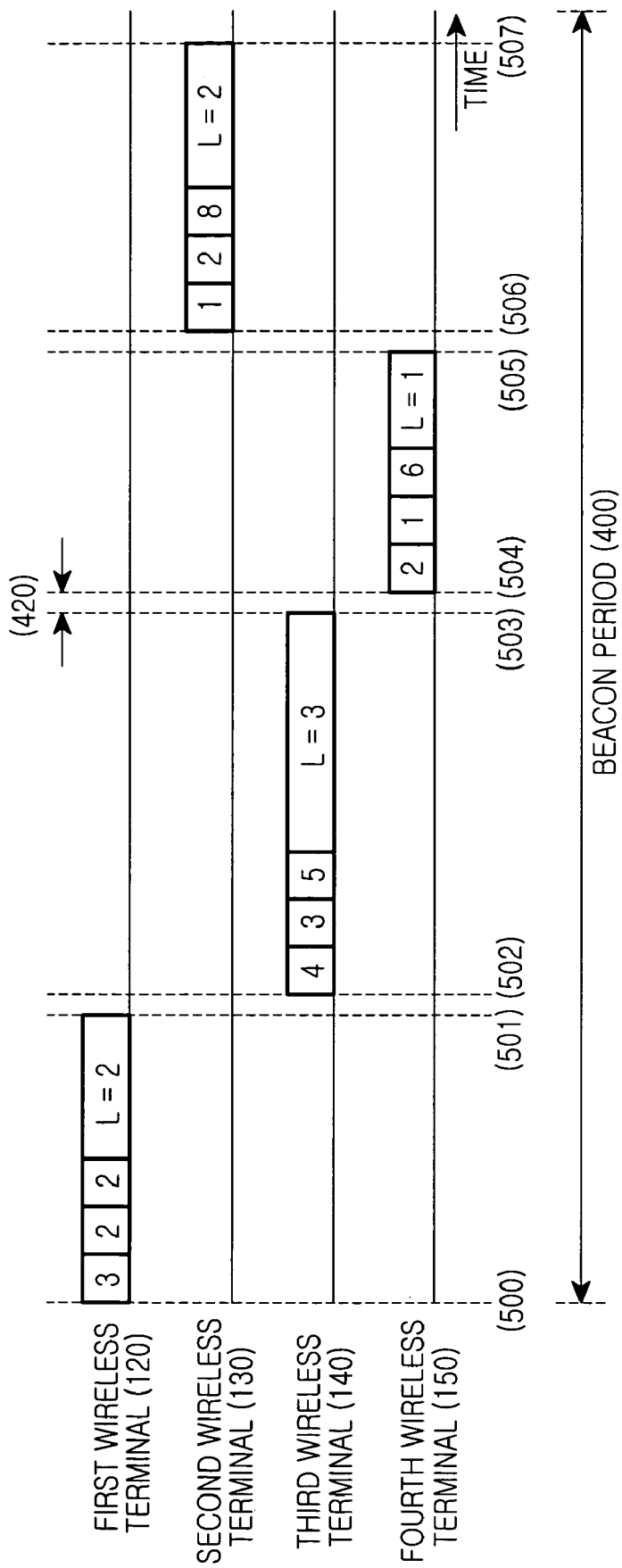
FIG. 5 is a timing chart when a wireless terminal transmits data according to a preferred embodiment of the present invention.

FIG. 5 is a timing chart when a wireless terminal transmits data according to a preferred embodiment of the present invention. The timing in which the wireless terminal transmits the data according to a schedule map of the present invention will be described with reference to FIG. 5. FIG. 5 considers only data transmission without showing the aforementioned beacon header and the connection request slots in FIG. 4. FIG. 5 is an example of a case in which the data is transmitted according to the schedule map as shown in Table 1.

As described in FIG. 4, when time periods of the beacon header 401 and the connection request slots 402 pass, the first wireless terminal 120, which will first transmit data, starts to transmit one frame at a time point 500. An address '3' of a wireless terminal, which will transmit data in the next data transmission interval, is recorded in the address area 311 of the header 310 in the frame. Further,'2' is recorded in the permitted transmission time area 312 of the header 310 as shown in Table 1, and '2', which is the time accumulated up to the current time point, is recorded in the accumulated transmission time area 313 of the header 310. The header 310 is then transmitted. The data stream is segmented into data which can be transmitted for two seconds, and the segmented data is inserted into the information area 320 and transmitted. Such a transmission continues up to a time point 501 according to the schedule map.

When the data transmission by the first wireless terminal 120 has been completed at the time point 501, all wireless terminals do not transmit data for the idle time. This is for clarifying a boundary between a collision of data and the data transmission. Accordingly, the third wireless terminal 140, the next wireless terminal, inserts data of '4, 3, and 5' into the header as described above, and inserts data segmented into data which can be transmitted for three seconds to generate one frame. Then, the third wireless terminal 140 transmits the generated frame from a time point 502, at which a preset idle time has passed, to a time point 503. When an idle time such as the reference numeral 420 passes, the fourth wireless terminal 150 generates a frame in the same manner and transmits the generated frame from a time point 504 to a time point 505. The second wireless terminal 130 transmits a frame from a time point 506 to a time point 507 in the same manner. In this way, a time for which all of the beacon header 401,the connection request slots 402, and the data transmission intervals are performed becomes one beacon period.

Figure 6:
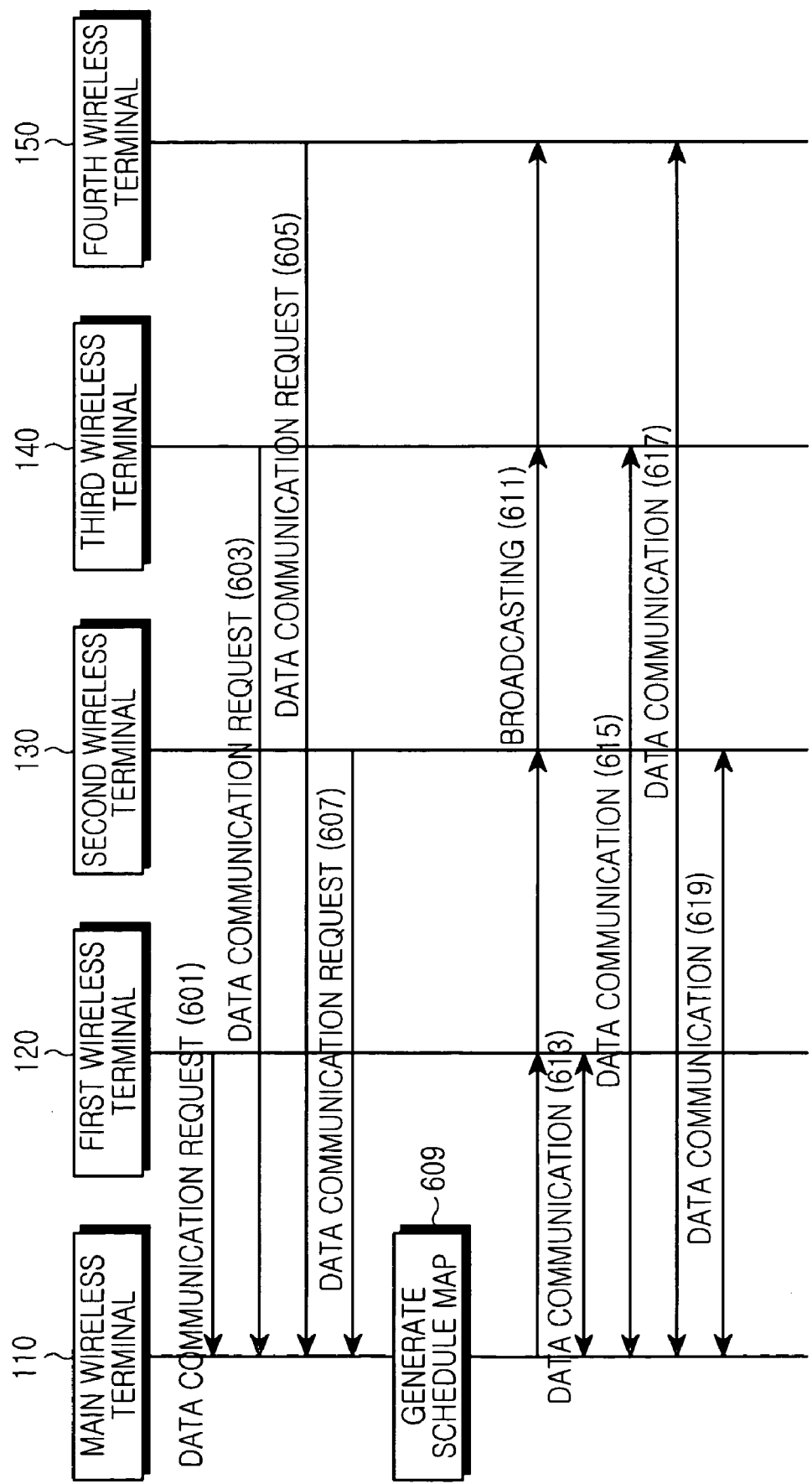
FIG. 6 is a flow diagram of a signal and data between wireless terminals when data communication is performed according to an embodiment of the present invention.

FIG. 6 is a flow chart of a signal and data between wireless terminals when data communication is performed according to an embodiment of the present invention. A case in which the data transmission is performed between each wireless terminal and the main wireless terminal 110 according to the present invention will be described with reference to FIG. 6.

When the data transmission to the main wireless terminal 110 is formed as shown in Table 1, the data transmission is requested in a sequence of the first wireless terminal 120, the third wireless terminal 140, the fourth wireless terminal 150, and the second wireless terminal 130. The data transmission request by each wireless terminal may be performed in the connection request slots 402 of one beacon period, but the data transmission request signal is received in different beacon period in most cases. However, in FIG. 6, a description will be given on the assumption that all data transmission requests are performed in the connection request slots 402 in one beacon period for convenience of description. Further, it is assumed that each wireless terminal transmits the data transmission request signal according to the sequence as shown in Table 1.

The first wireless terminal 120 transmits the data transmission request signal to the main wireless terminal 110 in step 601. When the data transmission request signal is received, the main wireless terminal 110 negotiates with the first wireless terminal 120 during the time required for communication. Through such a negotiation, the main wireless terminal 110 may generate a schedule map. Then, the third wireless terminal 140 performs a data transmission request in step 603, and the main wireless terminal 110 negotiates with the third wireless terminal 140 during a time period required for data communication similarly to a case of the first wireless terminal 120. The main wireless terminal 110 includes the time period negotiated with the third wireless terminal 140 in a data transmission time and generates a new schedule map. Such a process is applied to both the data transmission request performed by the fourth wireless terminal 150 in step 605 and the data transmission request performed by the second wireless terminal 130 in step 607.

The main wireless terminal 110 can generate the schedule map at the point in time at which the negotiation according to each connection request has been completed. When the connection request is received in each connection request slot, the main wireless terminal 110 performs the negotiation according to the connection request, and generates only a resultant according to the negotiation. Then, the main wireless terminal 110 can generate the schedule map as shown in Table 1 at a point in time at which all connection requests have been completed. As described above, the schedule map may be updated whenever the data transmission request exists from each wireless terminal. FIG. 6 shows a process in which the schedule map is generated at a time in step 609.

When the schedule map is completely generated as described above, the main wireless terminal 110 broadcasts information of the schedule map generated in step 609 so that all wireless terminals can receive the information in step 611. Then, each wireless terminal receives and stores the information, and can determine its own data transmission time point and a relation before or after the data transmission. Also, each wireless terminal can determine an entire beacon period. When a time period for which data can be transmitted is determined, each wireless terminal performs data communication according to the schedule map. That is, the first wireless terminal 120 generates a frame, which will be transmitted for a time period assigned to the first wireless terminal 120, in step 613, and transmits the generated frame to the main wireless terminal 110. The transmitted frame is generated in the same way as that shown in FIG. 3, and is then transmitted. When a preset idle time passes, the third wireless terminal 140, which is next in turn to transmit data, performs data communication with the main wireless terminal 110. In the next processes step 617 and step 619, each wireless terminal performs data communication with the main wireless terminal 110 in the same manner.

The case described in FIG. 6 is a case in which every wireless terminal has data to be transmitted. However, since data traffic is actually burst when generated, there may occur a case in which data to be transmitted does not exist even if there is a data transmission interval in the beacon period, which is reserved for data transmission by a specific terminal. Hereinafter, a process in which data are transmitted in such a case will be described with reference to FIG. 7.

Figure 7:
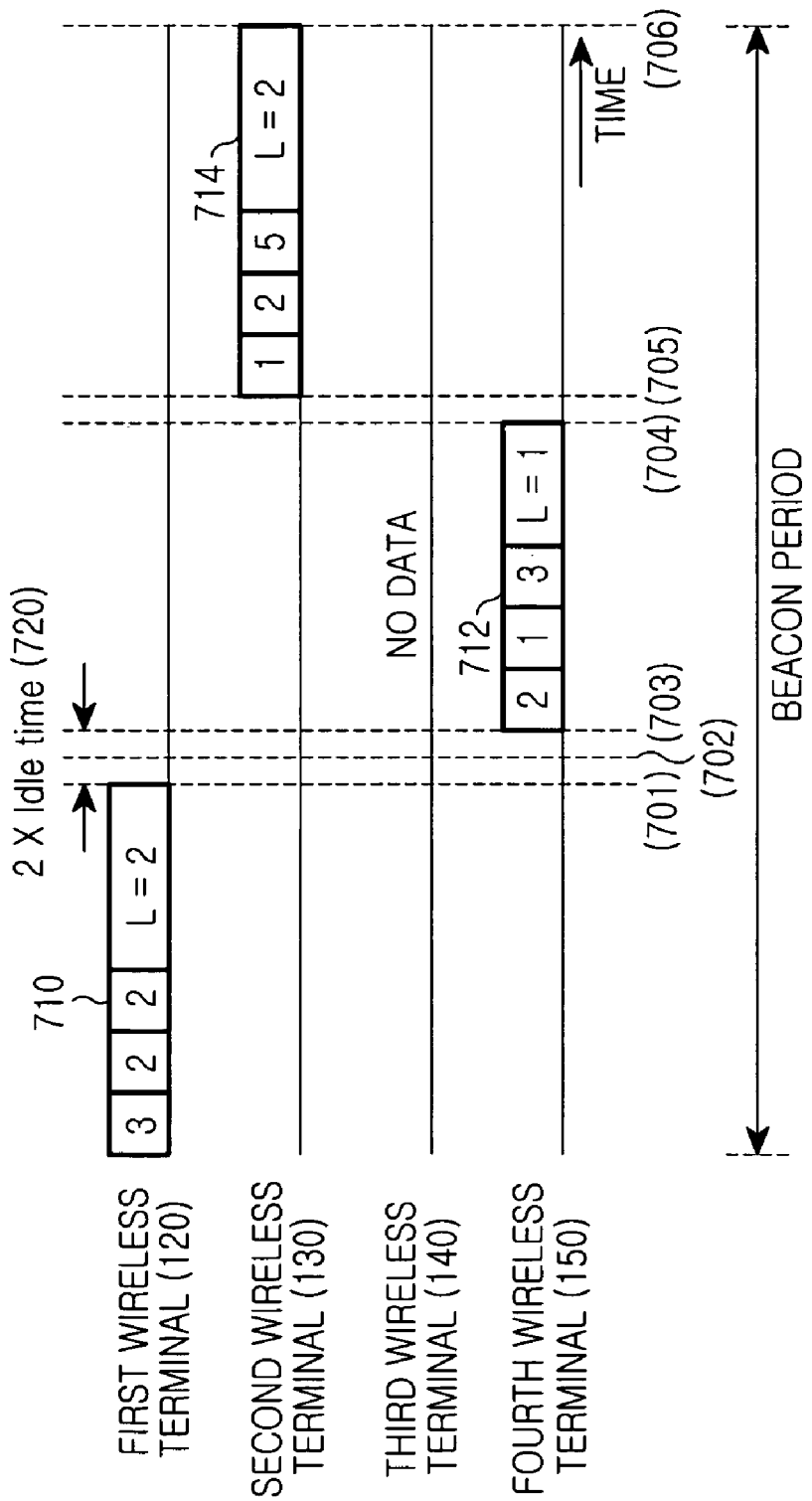
FIG. 7 is a timing chart of data transmission according to another embodiment of the present invention, in which a specific wireless terminal has no data to be transmitted at its own data transmission time point.

FIG. 7 is a timing chart of data transmission according to another embodiment of the present invention, in which a specific wireless terminal has no data to be transmitted at its own data transmission time point.

The first wireless terminal 120 generates a frame 710 including data which will be transmitted to the main wireless terminal 110, and transmits the generated frame. Herein, as described above, an address of a wireless terminal, which will transmit data in the next data transmission interval, is contained a header and transmitted. The first wireless terminal 120 completes the transmission at a time point 701. When the third wireless terminal 140, the next wireless terminal, has no data to be transmitted, the third wireless terminal 140 does not transmit data. Then, the fourth wireless terminal 150, the next wireless terminal after the third wireless terminal 140, further waits a preset idle time. That is, the fourth wireless terminal 150, which has a transmission sequence next to the third wireless terminal 140, waits a time period twice as long as a preset idle time. Then, when a transmission of a frame is not detected, the fourth wireless terminal 150 performs a transmission of a frame. Accordingly, when the frame is not detected after a time point 702, the fourth wireless terminal 150 further waits a preset idle time. Even after the waiting, when a transmission of a frame is not detected, the fourth wireless terminal 150 recognizes that the third wireless terminal 140 has no data to be transmitted, generates a frame 712 including data to be transmitted, and transmits the generated frame from a time point 703 to a time point 705. Then, the second wireless terminal 130 generates a frame 714 including data to transmit the generated frame in the same way as that described above.

However, when not only the third wireless terminal 140 but also the fourth wireless terminal 150 has no data to be transmitted, the fourth wireless terminal 150 does not transmit any frame. Then, the second wireless terminal 130 waits for duration of three times as long as a preset idle time, and generates a frame including data to be transmitted, and transmits the generated frame. Through such a method, when data to be transmitted does not exist, the next wireless terminal can automatically generate a frame to transmit the generated frame without adding a separate header.

Further, as described above, there may occur a case in which each peripheral wireless terminal has no data to be transmitted for a permitted transmission time. For instance, the first wireless terminal 120 must transmit two second of data as shown in FIG. 7. However, when only one second of data to be transmitted exists, data transmission will be completed before the time point 701 in FIG. 7. Then, when the third wireless terminal 140, which will perform the next data transmission, has data to be transmitted, an idle time passes after one second, and then data transmission does not occur, the third wireless terminal 140 transmits the data.

In addition, in a case in which the first wireless terminal 120 transmits one second of data and the third wireless terminal 140 has no data to be transmitted as shown in FIG. 7, when a time period twice as long as an idle time passes after the first wireless terminal 120 has transmitted one second of data, the fourth wireless terminal 150 starts data transmission. In this way, the data transmission time is modified within a time period set in advance and data can be transmitted.

As shown in FIG. 6, while communication is performed after a time is assigned to each wireless terminal and a sequence is determined, a new wireless terminal may request communication. That is, there may occur a case in which data transmission is requested through the connection request slot as shown in FIG. 4. Such a case will be described with reference to FIG. 8.

Figure 8:
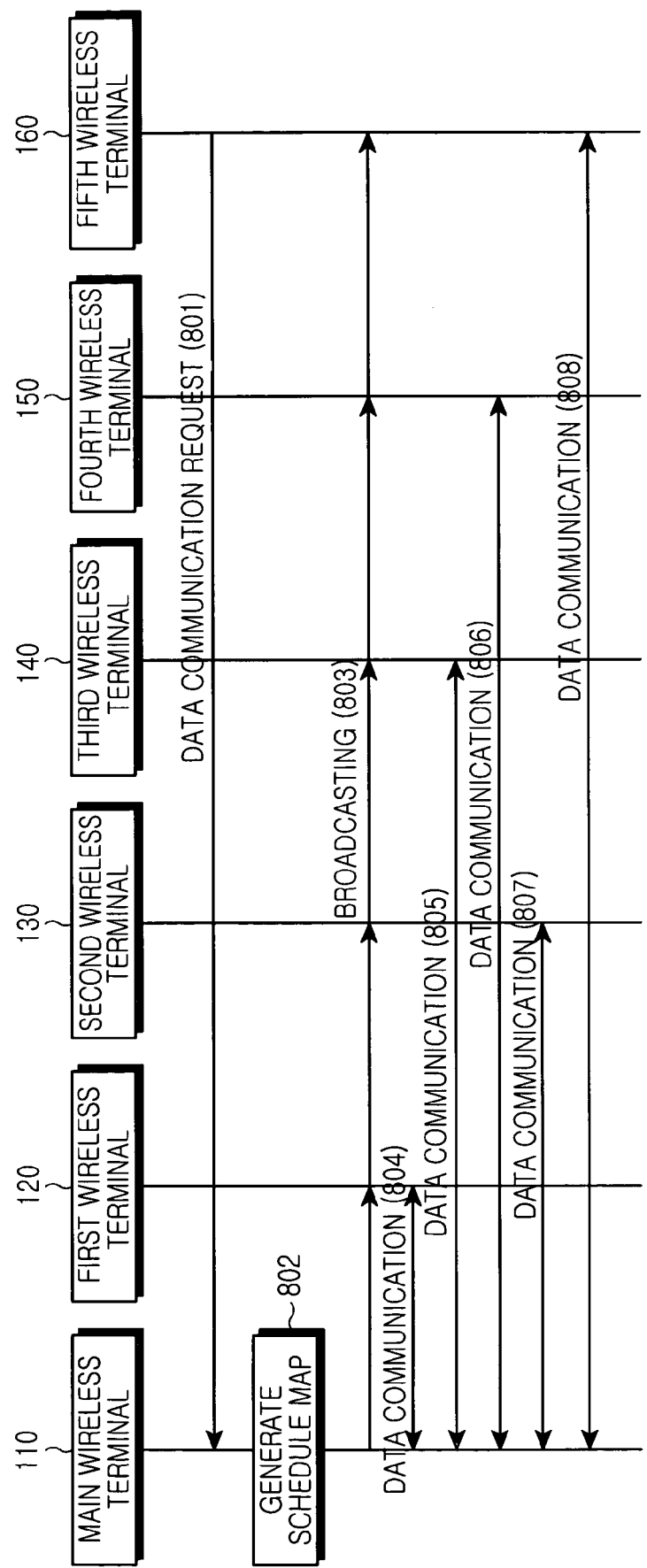
FIG. 8 is a flow diagram of a signal when a new wireless terminal requests data transmission according to another embodiment of the present invention.

FIG. 8 is a flow chart of a signal and a frame transmitted when a new wireless terminal requests data transmission according to another embodiment of the present invention.

The new wireless terminal detects the beacon period as describe above and requests the data communication through the connection request slots existing in one beacon period. That is, when a beacon header ends and when a point in time at which the connection request slots can be transmitted arrives, the fifth wireless terminal 160, which is to newly perform communication, transmits a signal for requesting data communication in step 801. Then, the main wireless terminal 110 determines a time period for which data will be transmitted through a negotiation with the fifth wireless terminal 160. Then, the main wireless terminal 110 generates a new schedule map in step 802. The schedule map as shown in Table 1 is updated as shown in Table 4 below.

TABLE 4

| Transmission sequence | Address of wireless terminal | Permitted transmission time (PTT) | Accumulated transmission time (ATT) |
|---|---|---|---|
| 1 | a first wireless terminal | 2 | 2 |
| 2 | a third wireless terminal | 3 | 5 |
| 3 | a fourth wireless terminal | 1 | 6 |
| 4 | a second wireless terminal | 2 | 8 |
| 5 | a fifth wireless terminal | 3 | 11 |

That is, in the schedule map generated by the main wireless terminal 110, a new transmission sequence is added as shown in Table 4. In addition, permitted transmission time information of a corresponding terminal and accumulated transmission time information depending on the permitted transmission time information are updated. The main wireless terminal 110 generates the new schedule map in step 802, and then broadcasts the schedule map so that all wireless terminals can receive the new schedule map in step 803. Through this broadcasting, each wireless terminal has the same schedule map. Then, in steps 804 to 808, each wireless terminal performs data communication as described above.

Further, the amount of data to be transmitted by a specific wireless terminal may suddenly increase. That is, there may occur a case in which data exceeding the amount of data which can be transmitted in a time period negotiated in advance must be continuously transmitted. Herein, the wireless terminal performs a new negotiation and must receive a time period for which it can transmit this additional data. In such a case, it is necessary to update the schedule map. Hereinafter, such a case will be described with reference to FIG. 9.

Figure 9:
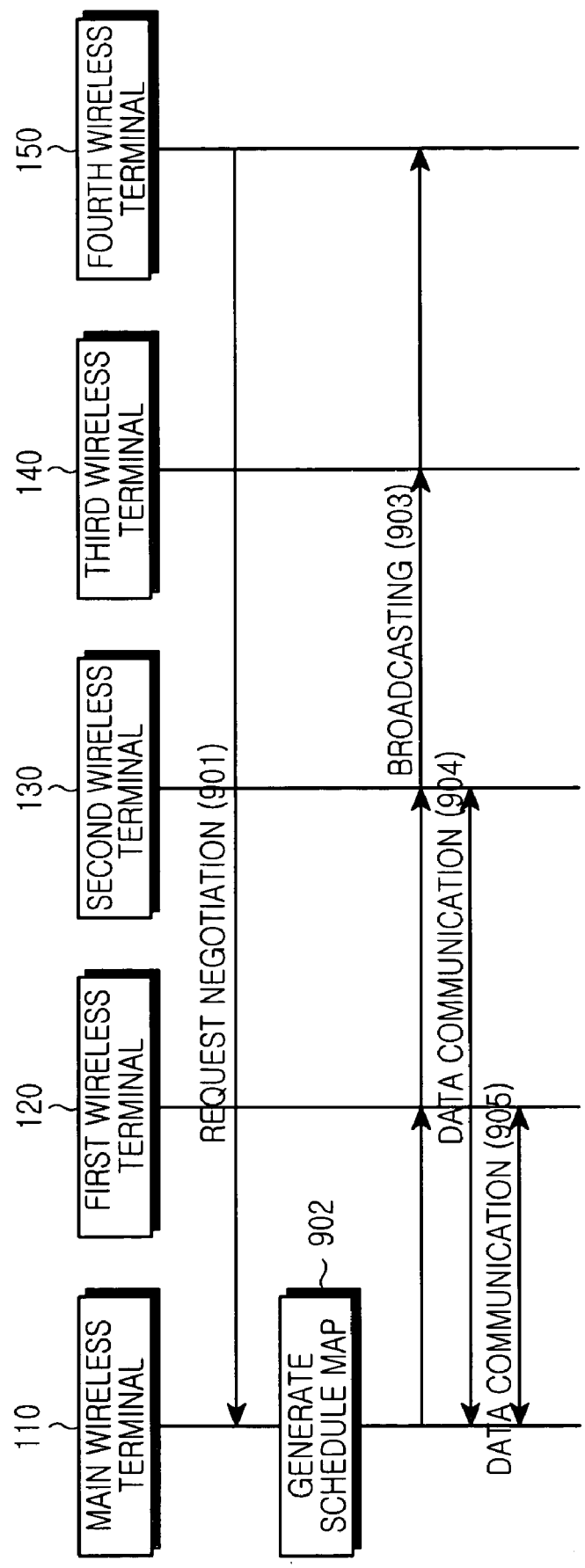
FIG. 9 is a flow diagram of a signal and a traffic after a negotiation for changing an established time according to another embodiment of the present invention.

FIG. 9 is a signal flow diagram of a signal and traffic after the negotiation for changing an established time period according to another embodiment of the present invention. FIG. 9 illustrates an example in which the established time period changes when communication is performed according to the schedule map in Table 1. The negotiation for changing the established time period can be performed in a transmission interval, in which each wireless terminal itself transmits traffic, without a separate channel. When the established time period must change, the fourth wireless terminal 150 generates a negotiation request signal at its own traffic transmission point in time to transmit the generated signal to the main wireless terminal 110. In step 901 in FIG. 9, the fourth wireless terminal 150 has a transmission point in time at which the fourth wireless terminal 150 transmits traffic data, but the fourth wireless terminal 150 does not transmit the data but requests a negotiation for changing a transmission time. The fourth wireless terminal 150 requests a negotiation and performs a negotiation with the main wireless terminal 110 for changing the established time period.

When the negotiation has been completed, the main wireless terminal 110 updates the schedule map according to received information. Further, when the update of the schedule map has been completed, the main wireless terminal 110 broadcasts the updated schedule map to all wireless terminals in step 903. Accordingly, all wireless terminals store the updated schedule map. An application point in time of the schedule map is generally from the next beacon period. However, the schedule map can be applied from a current beacon period. The embodiment in FIG. 9 shows an example in which the schedule map is applied from the next beacon period. It is considered that the fourth wireless terminal 150 has completed a frame transmission in step 901, and the second wireless terminal 130, the next wireless terminal, transmits its data in step 904 after receiving a broadcasting signal.

When such processes have been completed, the main wireless terminal 110 broadcasts the beacon header 401. Further, when time periods of the connection request slots 402 pass after the broadcasting of the beacon header 401 has been completed, the first wireless terminal 120 performs a transmission again. Herein, the first wireless terminal 120 performs the transmission according to the schedule map broadcasted in step 903.

Figure 10:
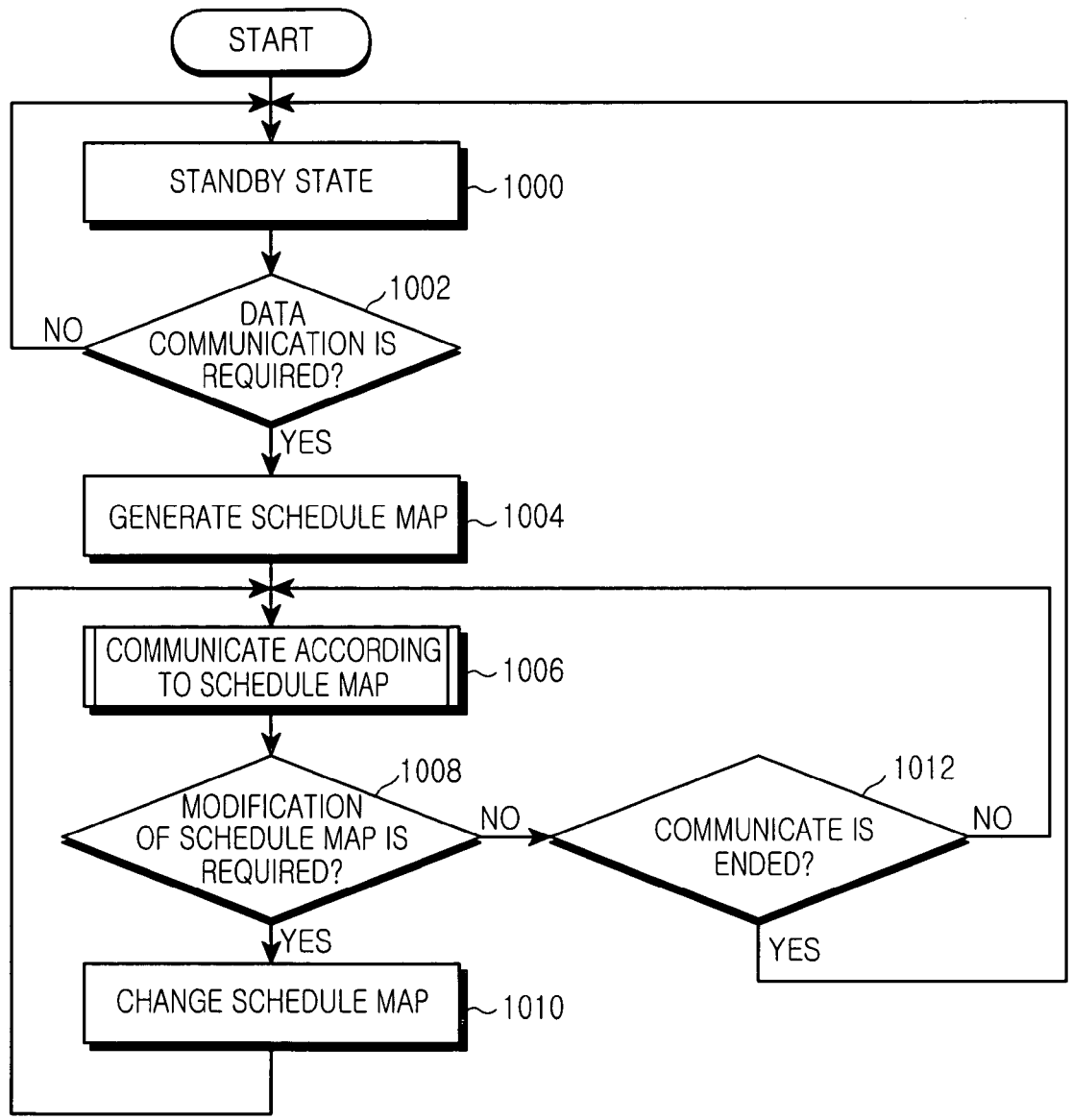
FIG. 10 is a flowchart of a local communication by a main wireless terminal according to an embodiment of the present invention.

FIG. 10 is a flowchart of a local communication by the main wireless terminal according to an embodiment of the present invention. Hereinafter, a control flow performed by the main wireless terminal 110 according to the present invention will be described with reference to FIG. 10.

The main wireless terminal 110 maintains a standby state in step 1000. Herein, a description will be given on an assumption that data communication is always performed. The standby state is a process of examining whether or not connection requests of other wireless terminals exist. For example, a time period for examining whether or not a connection request of a wireless terminal, which has not performed communication, exists through the connection request slots 402 after the beacon header has been transmitted can occur during the standby state.

The main wireless terminal 110 examines whether or not data communication must be performed in step 1002. The main wireless terminal 110 determines whether or not a connection request from a predetermined wireless terminal exists in the connection request slots 402. From the result of the determination, when the connection request exists and the data communication is required, step 1004 is performed. The main wireless terminal 110 generates a schedule map in step 1004. Such a schedule map is generated in the same form as that in Table 1. When the schedule map is generated in this way, the main wireless terminal 110 performs communication according to the generated schedule map in step 1006. Performing the communication according to the schedule map as described above represents a process in which communication is performed in the same manner as that in FIGS. 4 to 7.

The main wireless terminal 110 determines whether or not it is necessary to change the schedule map in step 1008 while performing the communication according to the schedule map. The determination of whether or not it is necessary to change the schedule map represents an determination of whether or not the change of the data transmission time is required as described in FIG. 9. As a result of the examination in step 1008, when it is necessary to change the schedule map, step 1010 is performed, otherwise, step 1012 is performed. First, when it is necessary to change the schedule map, the main wireless terminal 110 negotiates with a wireless terminal requesting a negotiation for the data transmission time in step 1010, and updates the schedule map according to the result of the negotiation. When the update of the schedule map has been completed as described above, step 1006 is performed.

In contrast, as a result of the determination in step 1008, when it is not necessary to change the schedule map, the main wireless terminal 110 determines whether or not the communication with all wireless terminals is ended in step 1012. As a result of the determination in step 1012, when the communication with all wireless terminals ends, step 1000 is performed, and the main wireless terminal 110 maintains the standby state. In contrast, when the communication with all wireless terminals is not ended, step 1006 is performed. The main wireless terminal 110 then performs communication according to the schedule map.

Figure 11:
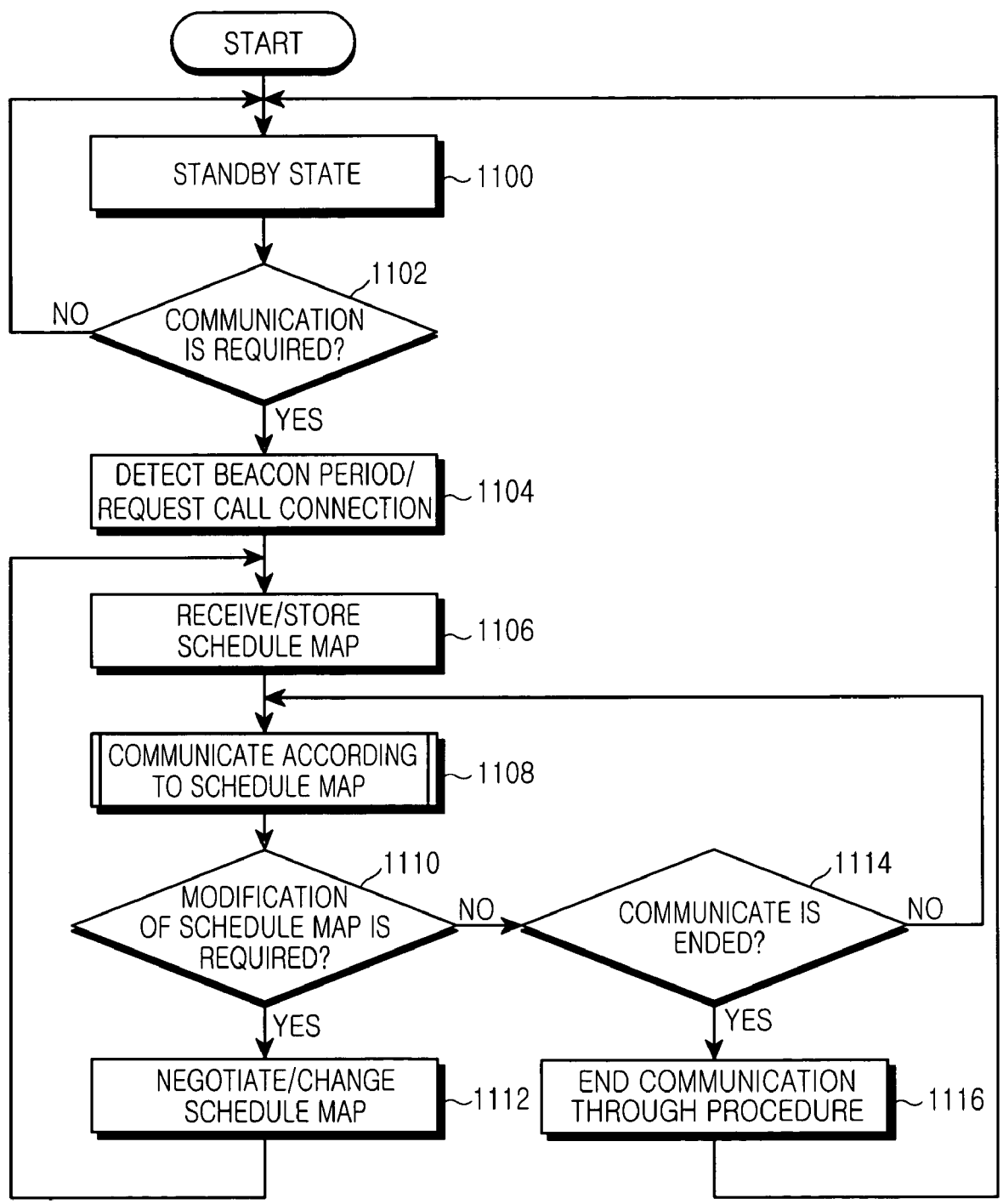
FIG. 11 is a flowchart of a local wireless communication by a peripheral wireless terminal according to an embodiment of the present invention.

FIG. 11 is a flowchart of a local wireless communication by a peripheral wireless terminal according to an embodiment of the present invention. Hereinafter, a control process when the peripheral wireless terminal performs the local wireless communication will be described in detail with reference to FIG. 11.

The peripheral wireless terminal maintains a standby state in step 1100. Herein, the standby state represents a standby state different from that in FIG. 10. That is, the standby state in FIG. 11 represents a state during which the peripheral wireless terminal performs other operations instead of performing the wireless communication, or does not perform any operation. The peripheral wireless terminal determines whether or not a communication request occurs in step 1102 while performing such a standby state. As a result of the examination in step 1102, when the communication request occurs, step 1104 is performed. Otherwise, the peripheral wireless terminal continuously maintains the standby state in step 1100.

The peripheral wireless terminal detects the beacon header 401 broadcast by the main wireless terminal 110 to examine the beacon period in step 1104. Accordingly, the peripheral wireless terminal can detect a point in time of the connection request slots 402 by examining the beacon period. When the point in time of the connection request slots 402 is detected, the peripheral wireless terminal requests a call connection to the main wireless terminal 110. Then, the peripheral wireless terminal determines data transmission time through a negotiation with the main wireless terminal 110. When the negotiation as described above has been completed, the peripheral wireless terminal receives and stores a schedule map, which is transmitted by the main wireless terminal 110, in step 1106. The peripheral wireless terminal performs communication according to the received schedule map in step 1108. Such a communication is performed in the same manner as that in FIGS. 4 to 7.

The peripheral wireless terminal determines whether or not it is necessary to change the schedule map while performing the communication according to the schedule map in step 1108. Herein, the determination of whether or not it is necessary to change the schedule map represents an determination of whether or not it is necessary to change the data transmission time as described in FIG. 8. As a result of the determination, when it is necessary to change the schedule map, the peripheral wireless terminal performs a negotiation for a time change with the main wireless terminal 110 at data transmission interval of the peripheral wireless terminal in step 1112. Then, the peripheral wireless terminal receives the information of the changed schedule map from the main wireless terminal 110 and stores the received information in step 1106. Then, step 1108 is performed.

In contrast, as a result of the determination in step 1110, when it is not necessary to change the schedule map, the peripheral wireless terminal determines whether or not the communication is ended in step 1114. Herein, the ending of the communication refers to a state in which a peripheral wireless terminal performing communication for a predetermined time in one beacon period has no data to be transmitted, or the peripheral wireless terminal is to delete its own communication time in the beacon period due to other reasons. As a result of the determination in step 1114, when the ending of the communication is required, the peripheral wireless terminal ends the communication through a specific procedure in step 1116. However, when data communication has not been performed for a beacon period having the number of times set in advance, the schedule map may automatically become modified. That is, when a transmission of a traffic does not exist for more than ten beacon periods, a corresponding peripheral wireless terminal may be deleted from the schedule map. Herein, step 1100 is performed without performing step 1116.

As described above, in the present invention, one access point can be efficiently connected and data communication can be performed without a specific overhead when local wireless communication is performed. In addition, when local wireless communication is performed in the same manner as that in the present invention, the efficient use of resources can be increased and data communication can be performed through an uncomplicated algorithm.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A local wireless communication method in a wireless communication system having an access point, at least two peripheral wireless terminals, and a main wireless terminal which relays data between the access point and the at least two peripheral wireless terminals, the method comprising:

generating by the main wireless terminal a schedule map comprising a transmission sequence for each peripheral wireless terminal and a transmission period; and transmitting by the main wireless terminal the schedule map to the at least two peripheral wireless terminals, wherein the transmission period comprises a permitted transmission time assigned to each peripheral wireless terminal for performing data communication and an accumulated transmission time obtained by accumulating a time period of data transmission by each peripheral wireless terminal starting from an initial transmission.

2. The method of claim 1, wherein:

the transmission period is provided for transmission of a frame by a peripheral wireless terminal, and a header of the frame comprises an address of a next peripheral wireless terminal for transmitting a frame in accordance with the schedule map, and the accumulated transmission time indicative of time accumulated for transmission of the frame by the peripheral wireless terminal and transmission of a frame by each of peripheral wireless terminals transmitting prior to the peripheral wireless terminal.

3. The method of claim 1, further comprising performing by each peripheral wireless terminal data communication with the main wireless terminal according to the transmission sequence and the transmission period determined in the schedule map.

4. The method of claim 1, further comprising communicating by the main wireless terminal a beacon header reporting a start of a beacon period before an initial data transmission time point, wherein the beacon period includes connection request slots for receiving a data communication request from other peripheral wireless terminals after the beacon header.

5. The method of claim 4, further comprising:
in response to a data communication request from another peripheral wireless terminal during the connection request slots, generating by the main wireless terminal an updated schedule map including a transmission period assigned to the another peripheral wireless terminal;
transmitting by the main wireless terminal the updated schedule map to the at least two peripheral wireless terminals and the another peripheral wireless terminal; and
performing by the at least two peripheral wireless terminals and the another peripheral wireless terminal data communication according to the updated schedule map.

6. The method of claim 1, wherein a preset idle time exists between data transmission intervals.

7. The method of claim 6, further comparing:
transmitting data by a first peripheral wireless terminal of the at least two peripheral wireless terminals to the main wireless terminal according to the schedule map, wherein the schedule map indicates an order of the transmission sequence as the first peripheral wireless terminal, a second peripheral wireless terminal of the at least two peripheral wireless terminals, and a third peripheral wireless terminal of the at least two peripheral wireless terminals;
in response to transmission of data not being detected by the third peripheral wireless terminal for a predetermined duration that exceeds the preset idle time, transmitting data by the third peripheral wireless terminal to the main wireless terminal after the data transmission by the first peripheral wireless terminal and the predetermined duration.

8. The method of claim 1, further comprising in response to receiving a request signal from a peripheral wireless terminal of the at least two peripheral wireless terminals to change a transmission period, the request signal being received at the transmission period assigned to the peripheral wireless terminal in the schedule map, generating by the main wireless terminal an updated schedule map based on the request signal.

9. A local wireless communication method in a wireless communication system having an access point, at least two peripheral wireless terminals, and a main wireless terminal which relays data between the access point and the at least two peripheral wireless terminals, the method comprising:
receiving by a peripheral wireless terminal a schedule map comprising a transmission sequence for each peripheral wireless terminal and a transmission period; and
storing by the peripheral wireless terminal the schedule map to transmit data to the main wireless terminal according to the transmission sequence and the transmission period determined in the schedule map,
wherein the transmission period comprises a permitted transmission time assigned to each peripheral wireless terminal for performing data communication and an accumulated transmission time obtained by accumulating a time period of data transmission by each peripheral wireless terminal starting from an initial transmission.

10. The method of claim 9, wherein:
the transmission period is provided for transmission of a frame by the peripheral wireless terminal, and
a header of the frame comprises an address of a next peripheral wireless terminal for transmitting a frame in accordance with the schedule map, and the accumulated transmission time indicative of time accumulated for transmission of the frame by the peripheral wireless terminal and transmission of a frame by each of peripheral wireless terminals transmitting prior to the peripheral wireless terminal.

11. The method of claim 9, wherein a preset idle time exists between data transmission intervals.

12. The method of claim 9, wherein:
the schedule map indicates the transmission sequence for the peripheral wireless terminal as following data transmission of another peripheral wireless terminal, and
the method further comprises in response to transmission of data not being detected by the peripheral wireless terminal for a predetermined duration that exceeds the preset idle time, transmitting data by the peripheral wireless terminal to the main wireless terminal after the predetermined duration.

13. The method of claim 9, wherein:
the schedule map indicates the transmission sequence for the peripheral wireless terminal as following data transmission of first and second peripheral wireless terminals, and
the method further comprises in response to transmission of data not being detected by the peripheral wireless terminal for a predetermined duration that exceeds the preset idle time, after detecting transmission of data corresponding to the first peripheral wireless terminal, transmitting data by the peripheral wireless terminal to the main wireless terminal after the data transmission by the first peripheral wireless terminal and the predetermined duration.

14. The method of claim 9, further comprising in response to increase in data to be transmitted, requesting by the peripheral wireless terminal to change the transmission period to the main wireless terminal during the transmission period assigned to the peripheral wireless terminal in the schedule map.

15. A wireless terminal for use in a wireless communication system having an access point and at least two peripheral wireless terminals, the wireless terminal comprising:
an access point interface for providing an interface with the access point;
a control unit for generating a schedule map comprising a transmission sequence for each peripheral wireless terminal and a transmission period;
a wireless processing unit for processing data and transmitting and receiving data with respect to the at least two peripheral wireless terminals; and
a user interface for providing an interface between a user and the wireless terminal, wherein the wireless terminal transmits the schedule map to the at least two peripheral wireless terminals and relays data between the access point and the two peripheral wireless terminals,
wherein the transmission period comprises a permitted transmission time assigned to each peripheral wireless terminal for performing data communication and an accumulated transmission time obtained by accumulating a time period of data transmission by each peripheral wireless terminal starting from an initial transmission.

16. The apparatus of claim 15, wherein in response to a data communication request from another peripheral wireless terminal, the control unit generates an updated schedule map including a transmission period assigned to the another peripheral wireless terminal.

17. The apparatus of claim 15, wherein in response to receiving a request signal from a peripheral wireless terminal of the at least two peripheral wireless terminals to change a transmission period, the control unit generates an updated schedule map based on the request signal.

18. A peripheral wireless terminal for use in a wireless communication system having an access point, a plurality of peripheral wireless terminals, and a main wireless terminal which relays data between the access point and the plurality of peripheral wireless terminals, the peripheral wireless terminal comprising:
  a memory for storing a schedule map comprising a transmission sequence for each peripheral wireless terminal and a transmission period;
  a control unit for controlling data transmission according to the schedule map;
  a wireless processing unit for processing data and transmitting and receiving data with respect to the main wireless terminal; and
  a user interface for providing an interface between a user and the peripheral wireless terminal,
  wherein the transmission period comprising a permitted transmission time assigned to each peripheral wireless terminal for performing data communication and an accumulated transmission time obtained by accumulating a time period of data transmission by each peripheral wireless terminal starting from an initial transmission.

19. The apparatus of claim 18, wherein:
  a preset idle time exists between data transmission intervals,
  the schedule map indicates the transmission sequence for the peripheral wireless terminal as following data transmission of another peripheral wireless terminal, and
  in response to transmission of data not being detected by the peripheral wireless terminal for a predetermined duration that exceeds the preset idle time, transmitting data by the peripheral wireless terminal to the main wireless terminal after the predetermined duration.

20. A system for performing a local wireless communication in a wireless communication system having an access point, at least two peripheral wireless terminals, and a main wireless terminal which relays data between the access point and the at least two peripheral wireless terminals, the system comprising:
  the main wireless terminal for generating a schedule map comprising a transmission sequence for each peripheral wireless terminal and a transmission period, and transmitting the generated schedule map to the at least two peripheral wireless terminals; and
  the at least two peripheral wireless terminals for storing the schedule map received from the main wireless terminal, and performing data communication with the main wireless terminal according to the transmission sequence and period determined in the schedule map,
  wherein the transmission period comprises a permitted transmission time assigned to each peripheral wireless terminal for performing data communication and an accumulated transmission lime obtained by accumulating a time period of data transmission by each peripheral wireless terminal starting from an initial transmission.

21. The system of claim 20, wherein in response to a data communication request from another peripheral wireless terminal, the main wireless terminal generates an updated schedule map including a transmission period assigned to the another peripheral wireless terminal.

22. The system of claim 20, wherein:
  a preset idle time exists between data transmission intervals,
  the schedule map indicates an order of the transmission sequence as a first peripheral wireless terminal of the at least two peripheral wireless terminals, a second peripheral wireless terminal of the at least two peripheral wireless terminals, and a third peripheral wireless terminal of the at least two peripheral wireless terminals,
  the first peripheral wireless terminal transmits data to the main wireless terminal according to the schedule map, and
  in response to transmission of data not being detected by the third peripheral wireless terminal for a predetermined duration that exceeds the preset idle time, the third peripheral wireless terminal transmits data to the main wireless terminal after the data transmission by the first peripheral wireless terminal and the predetermined duration.

23. The system of claim 20, wherein in response to receiving a request signal from a peripheral wireless terminal of the at least two peripheral wireless terminals to change a transmission period, the main wireless terminal generates an updated schedule .map based on the request signal.

* * * * *